United States Patent [19]  
Segal et al.

[11] Patent Number: 4,469,543  
[45] Date of Patent: Sep. 4, 1984

[54] LAMINATION OF HIGHLY REINFORCED THERMOPLASTIC COMPOSITES

[75] Inventors: Leon Segal; Anthony Testa, both of Morristown, N.J.

[73] Assignee: Allied Corporation, Morris Township, Morris County, N.J.

[21] Appl. No.: 142,580

[22] Filed: Apr. 22, 1980

Related U.S. Application Data

[63] Continuation of Ser. No. 964,315, Nov. 29, 1978, abandoned.

[51] Int. Cl.³ .......................... C09J 5/06; B32B 31/08
[52] U.S. Cl. ................... 156/283; 156/309.3; 156/309.9; 156/324; 428/273; 428/285; 428/287
[58] Field of Search .................. 156/283, 309.6, 309.9, 156/324, 244.22; 428/285–287, 246

[56] References Cited

U.S. PATENT DOCUMENTS

| | | | |
|---|---|---|---|
| 2,732,324 | 1/1956 | Morris | 156/283 |
| 2,833,686 | 5/1958 | Sandt | 156/333 X |
| 2,973,292 | 2/1961 | Schofield | 428/246 X |
| 3,259,535 | 7/1966 | Graff | 156/324 |
| 3,526,000 | 8/1970 | Williams | 156/244.27 X |
| 3,686,069 | 8/1972 | Winkler et al. | 156/283 X |
| 3,707,521 | 12/1972 | De Santis | 260/32.8 N X |
| 3,837,992 | 9/1974 | Sherman et al. | 156/309 X |
| 3,888,716 | 6/1975 | Morse | 156/276 |
| 4,062,711 | 12/1977 | Davis | 428/285 X |
| 4,098,943 | 7/1978 | Degginger et al. | 428/285 X |
| 4,165,404 | 8/1979 | Quehl | 156/333 X |

Primary Examiner—Alexander S. Thomas  
Attorney, Agent, or Firm—Richard A. Negin

[57] ABSTRACT

Disclosed is a method for preparing laminated thermoplastic composite structures comprised of at least one filler reinforced thermoplastic layer and at least one reinforcing layer of glass-fiber mat contiguous to at least one surface of said reinforced layer wherein an intermediate non-reinforced polymeric layer is applied between each glass-fiber mat/reinforced layer interface thereby achieving thorough impregnation of the glass-fiber mat with thermoplastic resin.

16 Claims, 1 Drawing Figure

LAMINATION OF HIGHLY REINFORCED THERMOPLASTIC COMPOSITES

This is a continuation of Application Ser. No. 964,315, filed Nov. 29, 1978, abandoned.

FIELD OF THE INVENTION

This invention relates to a method of laminating highly reinforced, viscous, thermoplastic layers to fibrous reinforcing layers.

DESCRIPTION OF THE PRIOR ART

A major problem in the continuous production of glass reinforced thermoplastic sheets is that of efficiently impregnating the layer of glass-fiber with the highly reinforced, viscous, thermoplastic layer.

One continuous method which teaches impregnation of the fiber-glass mat is disclosed in U.S. Pat. No. 4,098,943 and is incorporated herein by reference. This patent discloses a method for producing a composite laminated sheet comprising the steps of (a) blending and extruding a first sheet layer of filled thermoplastic, (b) polishing said layer in a roll stack, (c) blending and extruding a second sheet layer of thermoplastic containing a low level of filler, (d) feeding the first sheet, the second sheet and a long fiber glass mat into the nip of a set of laminating rolls while the second sheet is still in a molten condition.

Another continuous method is set forth in copending U.S. application Ser. No. 816,630, filed July 18, 1977, abandoned, and also incorporated herein by reference, and discloses a method similar to that of U.S. Pat. No. 4,098,943 except that the sheet layers can be absent of filler and the first sheet is embossed so that a plurality of projections is contained on one surface. The embossing allows the mat to be positioned more easily in the polymer matrix.

Although these methods have proven somewhat effective for impregnating the glass mat into the thermoplastic matrix, there is still a need in the art for alternative methods such as methods not requiring the use of additional extruders for the impregnating matrix.

SUMMARY OF THE INVENTION

In accordance with the present invention, a method is provided for continuously laminating at least one thermoplastic layer which is reinforced with particulate and/or short glass fiber filler to at least one glass-fiber mat reinforcing layer wherein the glass fiber is thoroughly impregnated with thermoplastic resin and said thorough impregnation is achieved by means of a layer of non-filled thermoplastic polymer compatible with the thermoplastic polymer of the reinforced layer wherein the non-filled (reinforced) thermoplastic layer is laminated between each reinforced layer/glass-fiber mat interface. In a preferred embodiment of the present invention, the thermoplastic is a polyamide.

DESCRIPTION OF THE PREFERRED EMBODIMENTS

Figure 1:
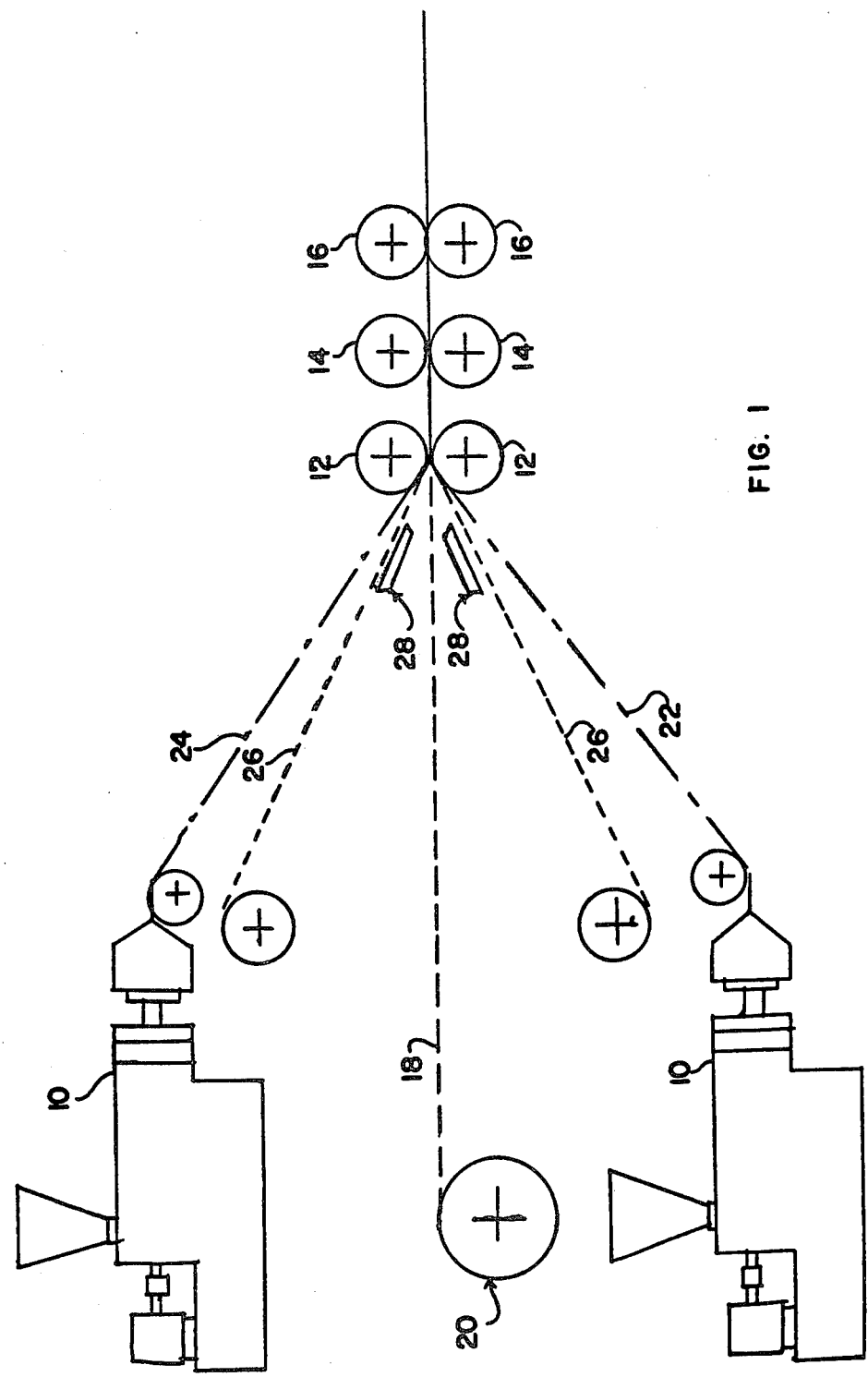
FIG. 1 depicts means which may be employed in preparing, in a continuous manner, the thermoplastic composite laminates of the invention.

Suitable thermoplastic materials which may be employed in the reinforced layers of the present composition comprise a wide range of polymeric compositions. Non-limiting examples include olefinic polymers such as polyethylene, polypropylene and copolymers and terpolymers thereof, e.g. copolymers of ethylene and ethyl acrylate; vinyl polymers comprising one or more of the following monomers: vinyl aryls such as styrene, o-phenylstyrene, m-phenylstyrene, p-phenylstyrene, o-methylstyrene, m-methylstyrene, p-phenylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene chloride, vinylidene bromide, and the like; vinyl esters such as vinyl acetate, vinyl propionate, vinyl butyrate, vinyl chloroacetate, vinyl benzoate, and the like; polycarbonates, that is, thermoplastics containing the following repeating units:

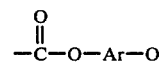

wherein Ar is the residue of an aromatic dihydric phenol; cellulosics, such as cellulose acetate, cellulose triacetate, cellulose acetate butyrate, cellulose propionate, ethyl cellulose, and the like; polyamides, polyesters such as polyethylene terephthalate, polyethylene isophthalate, poly(ethylene-2,7-naphthamate), polybutylene terephthalate, polypropylene terephthalate, copolymers thereof and the like; chlorinated polyethylene, chlorinated polyvinyl chloride, polyfluoroethylene, polytrifluorochloroethylene, polyhexafluoropropylene, copolymers thereof, such as copolymers of vinylidene fluoride and trifluorochloroethylene, and the like, as well as mixtures of any of the above.

Also suitable for use herein are polyurethane resins, polysulfone resins, polyacetal resins, halogenated olefins, and phenoxy resins. Included in the term "resin" are blends of two or more polymeric materials. Also contemplated within the term "resin" are the metallic salts of those polymers or blends thereof which contain free carboxylic acid groups. Non-limiting examples of such resins include ethylene-acrylic acid copolymers and ethylenemethacrylic acid copolymers. Illustrative of the metals which may be used to provide the salts of such carboxylic acid polymers are the mono-, di-, and tri- valent metals such as sodium, calcium and aluminum.

Preferred thermoplastic resins are polyamides, polyolefins, and polyesters; more preferred are specific polyolefins and polyesters such as polyethylene, polypropylene, polybutyleneterephthalate, and polyethyleneterephthalate. Most preferred are the polyamides.

Polyamides suitable for use herein include the long chain polymeric amides having recurring amide groups as part of the polymer backbone and preferrably having a number average molecule weight, as measured by membrane osmometry of about 15,000 to 40,000.

Non-limiting examples of such polyamides are: (a) those prepared by the polymerization of lactams, preferrably epsilon-caprolactam (nylon 6); (b) those prepared by the condensation of a diamine with a dibasic acid, preferably the condensation of hexamethylene diamine with adipic acid (nylon 6,6) and the condensation of hexamethylene diamine with sebaic acid (nylon 6,10); and (c) those prepared by self-condensation of amino acids, preferrably self-condensation of 11-aminoundecanoic acid (nylon-11); or random, block, or graft interpolymers consisting of two or more of these polyamides. Preferred are those obtained by the polymerization of epsilon-caprolactam.

The polyamides suitable for use herein can be produced by any conventional process known in the art. Illustrative of one such process which is suitable for producing polyepsiloncaprolactam involves two steps. The first step consists of heating epsilon-caprolactam and a hexamethylene diamine and water to a temperature of about 180° to 300° C. under superatmospheric pressure (about 200 to 280 lbs/in$^2$) to effect partial polymerization. The water is allowed to distill gradually from the reaction mixture while the polymerization continues after most of the monomer has been converted to a low molecular weight polymer. The pressure is reduced to atmospheric pressure wherein the second step is commenced which comprises completing the polymerization by heating at atmospheric pressure in the range of about 180° to 300° C.

Also suitable for use herein are polyamide interpolymers comprised of a polyamide and one or more comonomers. Non-limiting examples of such comonomers include acrylic or methacrylic acid and/or their derivatives, such as acrylonitrile, acrylamide, methyl, ethyl, propyl, butyl, 2-ethyl-hexyl, decyl and tridecyl esters of acrylic or methacrylic acid, vinyl esters such as vinyl acetate and vinyl propionate, vinyl aromatic compounds such as styrene, methyl styrene, and vinyl toluenes and vinyl ethers such as vinyl esobutyl ether.

The glass-fiber reinforcing layer as used herein is intended to be employed in a broad sense to include glass mat, as well as individual continuous fibers, more particularly known as filaments, which have a length greater than about 1 inch. Also suitable are groups of twisted strands, more particularly known as yarn or thread; untwisted or slightly twisted groups of strands more particularly known as roving; discontinuous lengths of fibers, more particularly known as staple fibers, which can be spun into threads, twisted strands, slivers, roving or yarn. Preferred is glass fiber strand mat in the form of strands or bundles which are at least about 1 inch to continuous in length. This mat can be woven or nonwoven and if nonwoven, the strands or fibers are held together by resinous adhesive binders or by "needle punching". If woven, the strands or fibers are held together by mechanical interaction of the randomly patterned weblike structure. In one commercially available form of strand mat, the long strands are chopped strands which are 2 to 20 inches in length, preferably 3 to 10 inches.

The strands are composed of a plurality of fibers usually numbering 2 to 400, preferably 5 to 120. The individual fiber diameter ranges from about 0.0002 to 0.001 inch, preferably 0.0003 to 0.0008 inch and the strand diameter measures at least 0.001 inch, preferably 0.0015 to 0.004 inch in diameter. A nonwoven mat produced from such fiber will generally have a thickness of about 0.1 to 0.2 inches which adds to the difficulty of sufficiently bonding said mat in a thermoplastic laminated composite structure.

The reinforced thermoplastic layer includes a particulate mineral filler which reduces cost and improves the flexual and tensile modulus of the resulting sheet and is present in an amount of about 5 to 40% by weight of the extruded layer, preferably 15 to 30 wt.% and more preferably 20 to 25 wt.%. The reinforcing fillers suitable for use herein may be selected from a wide variety of minerals, metals, metal oxides, siliceous materials, metal salts, organic materials and mixtures thereof. Advantageous physical properties are achieved if the filler material has a Young's modulus of 10$^7$ psi or greater and at least a Young's modulus twice as great as that of the polymer. Examples of fillers included in these categories are alumina, aluminum hydrates, feldspar, asbestos, talc, calcium carbonates, clay, carbon black, quartz, novaculite, and other forms of silica, kaolinite, bentonite, garnet, saponite, beidellite, calcium oxide, wollastonite, calcium hydroxide, etc., as well as short reinforcing fibers (less than 2 inches in length) such as glass, metal, carbon, jute, hemp, sisal or organic polymeric fibers. The fillers listed above are given as examples only and are not intended as a limitation on fillers that can be utilized in the invention. The fillers may be coated with sizing agents, coupling agents, adhesion promoters, wetting agents and the like, as are known to those skilled in the art.

Coupling agents suitable for use herein are preferably organosilane compounds such as halogenated or non-halogenated vinyl and alkyl containing, alkylalkoxy, alkenyl, aminoalkyl, aminoalkoxy, acyloxy, alkenylacyloxy and similar silanes, their hydrolysis products and polymers thereof. For example, compounds of the following compound may be employed:

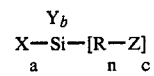

wherein X is a hydrolyzable group capable of reaction with a hydroxyl group, Y is hydrogen or a monovalent hydrocarbon group, R is an alkylene group of from 1 to 20 carbon atoms, Z is a group capable of reaction with a polyamide, n is an integer from 0 to 1, a is an integer from 1 to 3, b is an integer from 0 to 2, c is an integer from 1 to 3 and the sum of a+b+c equals 4. Compounds of this nature are described in U.S. Pat. No. 3,419,517 to Hedrick et al. Exemplary of specific compounds which may be employed herein are aminopropyltriethoxysilane, vinyltriethoxysilane, vinyltrimethoxy-ethoxy)silane, and the like. The coupling agents can be present in an amount of about 0.1 to 1.0% by weight of the total sheet, preferably 0.25 to 0.5%.

Other conventionally known additives of value in thermoplastic sheet formulations are also suitable for use herein. Nonlimiting examples of such additives include antistatic agents, plasticizers, lubricants, nucleating agents, impact modifiers, colorants, heat and light stabilizers, and other similar processing aids and adjusants.

The polymeric intermediate layers of the present invention are comprised of polymer materials which are compatible with the thermoplastic resin of the structural layers and which are for the most part unfilled and more flowable as compared to the more viscous filled structural layers. By compatible we mean that the intermediate layer when laminated to the reinforced thermoplastic for a period of 1 week, will not delaminate nor show signs of delamination over a temperature range of about 0° to 90° C. and at 0 to 100% relative humidity. This intermediate polymeric layer which is preferrably comprised of a polymer of the same generic class as the polymer of the structural layers and more preferrably the same species, can be in the form of a film either continuously extruded or from a roll of prefabricated film. The intermediate layer can also be applied in powder form and heated to melt temperature immediately before lamination. In all cases the polymeric material is heated to a temperature above its melting point immediately before the layers are passed through laminating rolls. The heating means, if used, can be any conventional heating means such as infrared heaters, gas filled heaters etc.

Non-limiting examples of intermediate polymeric layers compatible with various reinforced thermoplastic layers include: composites wherein both the intermediate and reinforced layers are comprised of either the same or different type polyamides; wherein an intermediate layer of a polyester and a reinforced layer of a polyamide are present; wherein an intermediate layer of a polycarbonate and a reinforced layer of a polyester such as polyethyleneterephthalate are present; and wherein an intermediate layer of polyethylene and a reinforced layer of polypropylene are present.

Preferably, the components constituting the reinforced thermoplastic layer are thoroughly blended together prior to being fed into the extruder. For this purpose, conventional mixing apparatus can be employed. Good results have been obtained utilizing a tumbling-type or high intensity mixer. It is desirable to first blend the thermoplastic resin, which may be in pellet or powder form, with the coupling agent so that the latter wets the resin; the mineral filler is then added, as well as any colorants or pigments or other conventional additives. Mixing is continued and thereafter the short glass-fibers are added. Mixing may be performed at any suitable temperature but it is preferred to dry mix the components at about room temperature (20° C.).

As an example of a typical mixing operation for a polyamide composition, polyamide pellets and the coupling agent are mixed at room temperature in a tumbler for about 3 to 5 minutes, mineral filler is added and blending is continued for about 5 to 10 minutes, the short glass-fibers are added and blending continued for about an additional 1 to 3 minutes. Mixing times greater than 3 minutes in the final mixing step tend to agglomerate the fibers and hence should be avoided.

Referring now to the drawing, the blended compositions comprising the reinforced layers are fed to the feed throat of conventional extruders 10 which can be single or double barrel extruders. The compositions are extruded as reinforced thermoplastic sheets 22 and 24 at a temperature above the melting point of the thermoplastic resin, that is, above about 220° C. and preferably in the range of about 230° C. and 280° C. for polyepsiloncaprolactam. The composition is extruded through the die head of the extruder in the form of a relatively thick sheet typically between about 50 and 300 mils thick. The sheet is passed between pairs of laminating and pulling rolls 12, 14 and 16. The number of pairs of rolls is not critical as long as a sufficiently laminated composite is produced. The laminating rolls, also referred to as compression rolls, are typically adjusted to exert a pressure of about 150 to 1500 pounds per inch of sheet width, preferably about 800 to 1200 pounds per inch of sheet width in order to effectuate impregnation of the glass mat and assure sufficient adhesion of the layers. It is also within the scope of the present invention to use compression or laminating belts instead of rolls.

A layer 18 of long glass-fiber is fed between the reinforced thermoplastic sheets concurrently with entrance of the sheets into the rolls. The purpose of the long glass-fiber is to provide rigidity, strength and thermal and impact resistance to the final product. It also facilitates handling of the composite laminate in the processing steps, particularly the steps of heating and transfer to the stamping press. This glass-fiber may be in the form of a woven or nonwoven mat having continuous or finite lengths of glass fibers (i.e., strands or filaments) with or without sizing agents and/or binders. The glass mat is a porous light weight material and typically has a thickness of between about 10 and 150 mils and a weight of about 0.1 to 5 ounces per square foot. Glass fiber mat from about 0.1 to 0.25 ounces per square foot is generally referred to as veil and can be used herein on either or both sides of the glass mat to mask wrinkles in said mat which may show through the surface layers of the composite. The glass fibers employed in the mat or veil may be formed of any suitable glass, preferably of commercial E-glass and the fibers typically are of a diameter in the range referred to previously with respect to the glass fiber of the sheet. The mat or veil is supplied in sheet form and may be wound in a roll 20 or provided in other configurations.

Intermediate layers of polymeric material 26, compatible with the reinforced layers, are applied between the interfaces of the glass fiber mat and the reinforced layers. These intermediate layers can be applied in film below its melting point form 26 as shown in FIG. 1 or can be applied in molten or powder form. When the intermediate layer is applied in the form of film below its melting point it is heated by external heating means 28 to about its melting temperature immediately before being laminated. If the intermediate layer is applied in powder form, the polymeric powder is deposited gravimetrically onto the glass-mat 18 and the reinforced layer 22. Heaters 28 would then be reversed in a downward direction so as to melt the powder immediately before lamination.

After lamination, the composite sheets are thereafter cut or otherwise formed into blanks of desired size. Any conventional cutting arrangement may be employed, desirably one that travels with the moving laminate. If desired, the composite sheet may be cooled by air cooling or the like, prior to cutting.

The resultant laminate can be compression molded, stamped or otherwise shaped by application of heat and pressure. The composite sheet may be formed into an article by a cold or hot stamping operation, that is, at sheet temperatures below or above the melting point. It has been found that cold or hot forming in metal stamping equipment provides acceptable stamped parts. Exemplary of the parts which can be stamped from the composite sheets are automotive decorative and/or structural parts such as deck lids, fender extenders, oil pans, bumpers, headlight housings and the like.

The composite sheet can be stamped in line before or after the cutting step. It may be cooled or allowed to cool prior to stamping and packaging.

What is claimed is:

1. A method of continuously laminating a polyamide sheet comprised of at least one layer of filler reinforced polyamide resin contiguous to a resin impregnated reinforcing glass mat, comprising steps of:
feeding at least one layer of filler reinforced polyamide resin between a pair of laminating rolls, said one layer heated to above its melt temperature;
feeding a layer of fiberglass mat between the pair of laminating rolls with the at least one layer of filler reinforced polyamide;
feeding a layer of unfilled polymer between the fiberglass mat and each filler reinforced polyamide layer, said unfilled polymer layer being heated to at least its melt temperature, less viscous than the filler reinforced layer, and compatible with the polyamide of the filler reinforced polyamide layer to the laminating rolls; and laminating the at least one layer of filler reinforced polyamide layer to the layer of glass mat, with layers of unfilled polymer between the fiberglass mat and each filler reinforced polyamide layer, between the laminating rolls, whereby the less viscous, heated, unfilled polymer layer is thoroughly impregnated into the glass mat and each filler reinforced polyamide layer adheres to the impregnated glass mat.

2. The method of claim 1 wherein the polyamide is selected from the group consisting of polyepsiloncaprolactam and a polyamide containing units derived from hexamethylene diamine and adipic acid.

3. The method of claim 2 wherein the polyamide is polyepsiloncaprolactam.

4. The method of claim 1 wherein the non-reinforced polymeric layer is introduced as a film.

5. The method of claim 1 wherein the non-reinforced polymeric layer is introduced as a powder.

6. The method of claim 1 wherein the non-reinforced layer is introduced in a molten state.

7. The method of claim 1 wherein each reinforced layer is comprised of polyepsiloncaprolactam, from 5 to 40 wt.% particulate filler and from 5 to 40 wt.% short glass fiber.

8. The method of claim 1 wherein the composite structure is comprised of two reinforced polyamide layers having a glass-fiber mat sandwiched between said reinforced layers.

9. The method of claim 8 wherein the non-reinforced polymeric layers are comprised of one or more polyamides.

10. A method of continuously laminating a thermoplastic sheet comprised of at least one layer of filler reinforced thermoplastic resin contiguous to a resin impregnated reinforcing glass mat, comprising the steps of:

feeding at least one layer of filler reinforced thermoplastic resin between a pair of laminating rolls, said one layer heated to above its melt temperature;

feeding a layer of fiberglass mat between the pair of laminating rolls with the at least one layer of filler reinforced thermoplastic;

feeding a layer of unfilled polymer between the fiberglass mat and each filler reinforced thermoplastic layer, said unfilled polymer layer being heated to at least its melt temperature, less viscous than the filler reinforced thermoplastic layer, and compatible with the thermoplastic of the filler reinforced thermoplastic layer; and laminating the at least one layer of filler reinforced thermoplastic layer to the layer of glass mat, with layers of unfilled polymer between the fiberglass mat and each filler reinforced thermoplastic layer, between the laminating rolls, whereby the less viscous, heated, unfilled polymer layer is thoroughly impregnated into the glass mat and each filler reinforced thermoplastic layer adheres to the impregnated glass mat.

11. The method of claim 10 wherein the thermoplastic is selected from the group consisting of polyamides, polyesters, olefinic polymers, vinyl polymers, cellulosic polymers, polyurethanes, polysulfones, polyacetals, and phenoxy resins.

12. The method of claim 11 wherein the thermoplastic is selected from the group consisting of polyamides, polyesters, and olefinic polymers.

13. The method of claim 10 wherein the thermoplastic resin of the reinforced layer and intermediate polymeric layers are both polyesters.

14. The method of claim 13 wherein the polyester is polyethylene terephthalate.

15. The method of claim 10 wherein the thermoplastic is a polyamide and the intermediate polymeric layer is a polyester.

16. The method of claim 15 wherein the polyamide is polyepsiloncaprolactam and the polyester is polyethylene terephthalate.

* * * * *